L. LAZARETH.
DEMOUNTABLE VEHICLE BODY.
APPLICATION FILED SEPT. 1, 1920.
1,410,935.
Patented Mar. 28, 1922.
4 SHEETS—SHEET 2.
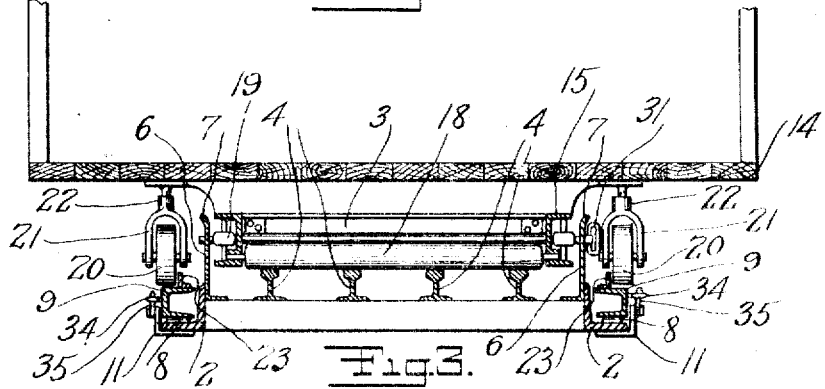
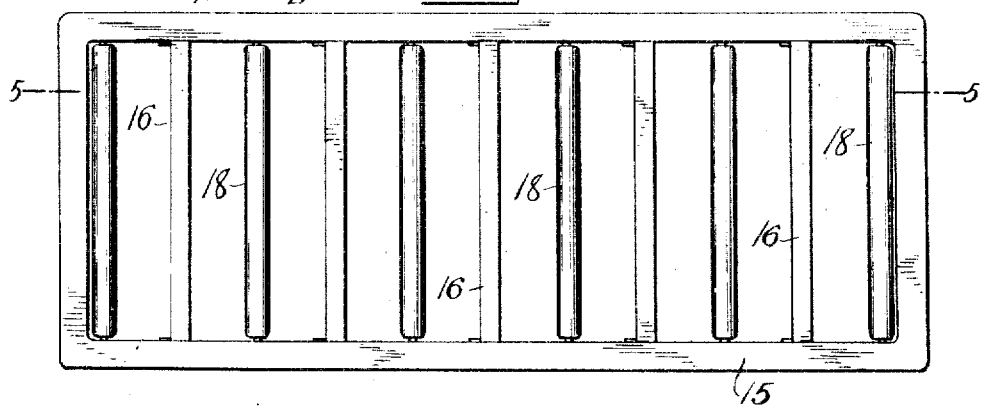
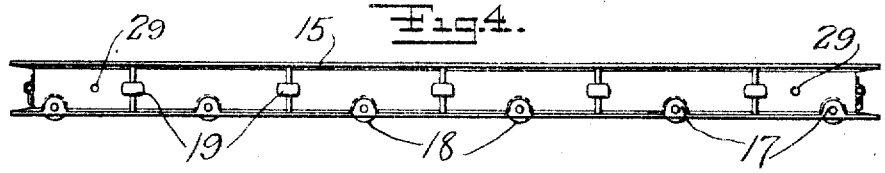
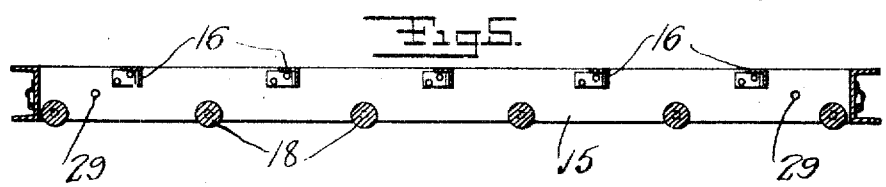
Inventor
Leonhard Lazareth
By his Attorney
Paul M. Klein

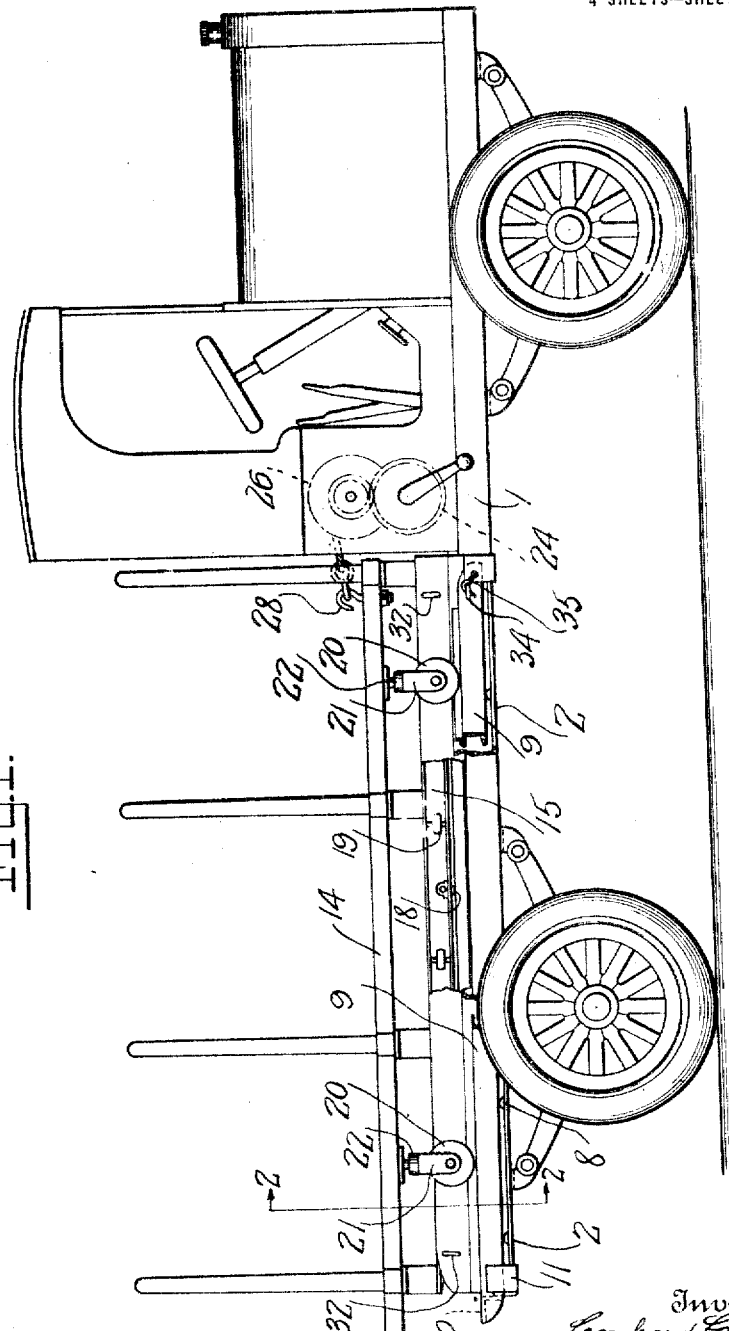

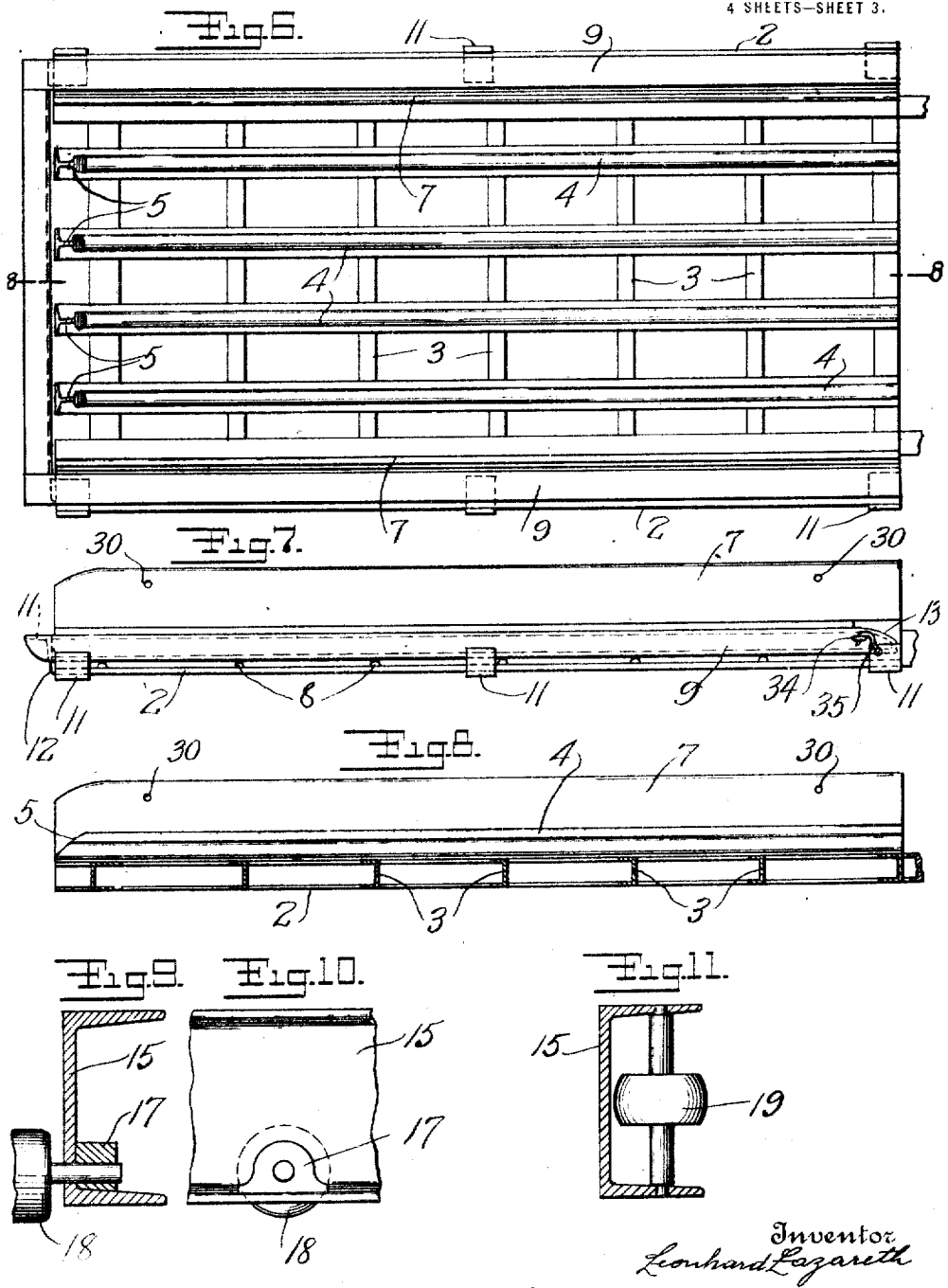

L. LAZARETH.
DEMOUNTABLE VEHICLE BODY.
APPLICATION FILED SEPT. 1, 1920.
1,410,935.
Patented Mar. 28, 1922.
4 SHEETS—SHEET 4.
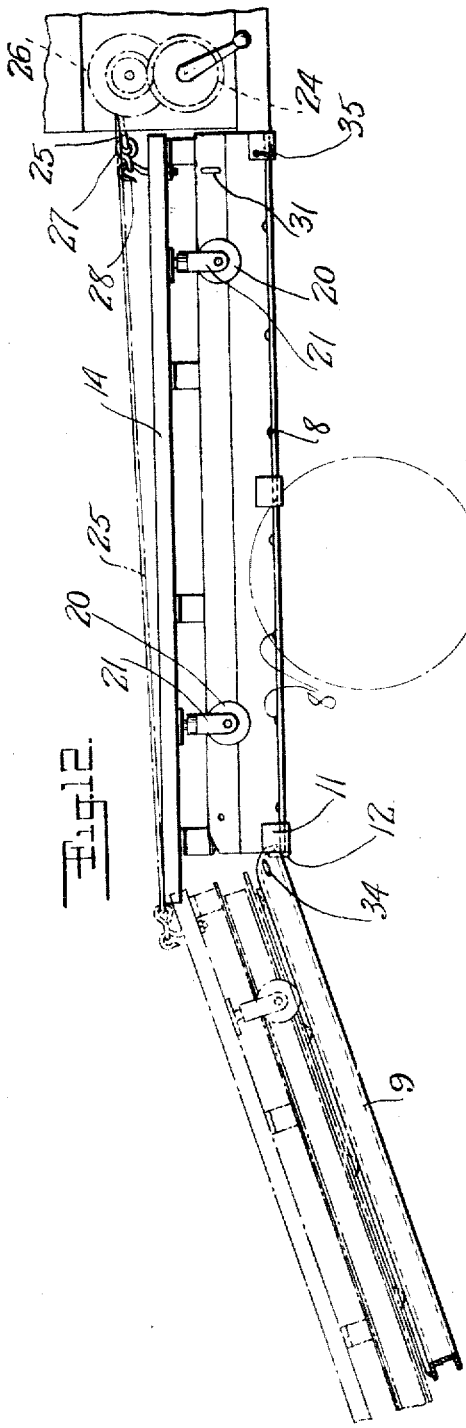
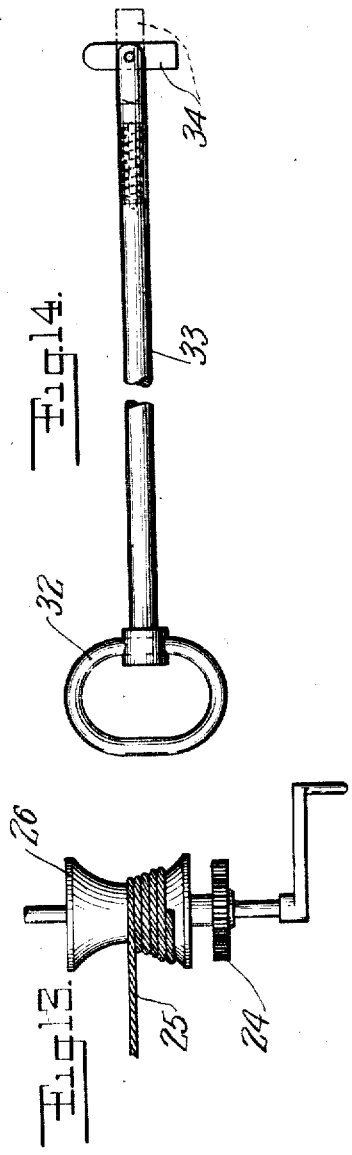
Inventor
Leonhard Lazareth
By his Attorney
Paul M Klein

UNITED STATES PATENT OFFICE.

LEONHARD LAZARETH, OF HOBOKEN, NEW JERSEY.

DEMOUNTABLE VEHICLE BODY.

1,410,935.　　　　　Specification of Letters Patent.　　Patented Mar. 28, 1922.

Application filed September 1, 1920. Serial No. 407,499.

*To all whom it may concern:*

Be it known that I, LEONHARD LAZARETH, a subject of Germany, and resident of Hoboken, in the county of Hudson and State of New Jersey, have invented certain new and useful Improvements in Demountable Vehicle Bodies, of which the following is a specification.

This invention relates to vehicles in general and in particular to the kind having removable bodies.

The primary objects of my invention are to provide a vehicle of simple and inexpensive construction with a removable and exchangeable body or bodies for the purpose of facilitating the loading, unloading and the transportation of loaded and unloaded bodies from place to place while using but one power driven understructure, the chassis, and to facilitate the manual individual moving of the body or bodies on floors or the ground upon means specially adapted for this purpose and entirely independent of means for supporting the body or bodies upon the chassis of the vehicle.

Other objects of my invention are to provide in combination with such vehicle means for guiding the body within the chassis and means for facilitating the unloading and loading of the body from and on the chassis.

The more specific objects of my invention are to provide a chassis of a vehicle with a frame for supporting the removable body and an unloading frame for facilitating the gliding of the body down to the ground upon wheels pivotedly attached to the body and means for facilitating the moving of the body down or up on the unloading frame and upon the chassis frame.

The foregoing and still further objects will be readily observed from the following description and the accompanying drawings, in which:

Figure 1 represents a truck embodying my invention.

Figure 2 is a sectional detail view taken on line 2—2 of Figure 1.

Figure 3 is a plan view of the body frame.

Figure 4 is a side view thereof.

Figure 5 is a sectional view taken on line 5—5 of Figure 4.

Figure 6 is a plan view of the chassis frame.

Figure 7 is a side view thereof.

Figure 8 is a sectional view taken on line 8—8 of Figure 6.

Figures 9 and 10 are detail views of the body frame showing the construction of horizontal rollers.

Figure 11 is a detail sectional view illustrating the arrangement of a side guide-roller.

Figure 12 is a diagrammatical view of a vehicle chassis showing the body frame in two positions, one when associated with the chassis, the other (in broken lines) when resting upon the unloading frame.

Figure 13 is a detail view of the winding mechanism for facilitating elevating or descending of the body in relation to the chassis.

Figure 14 illustrates a key for securing the body and unloading frames to the chassis.

In the drawings a chassis 1 of a motor driven vehicle is shown, the rear part of which is preferably built out to a rectangular frame, as seen in Figures 6, 7 and 8 or such frame may be readily attached to the standard chassis. For convenience this frame will be called the chassis frame. It comprises an angle iron construction as shown, but may be also made of channels or other standard steel types. Its side bars 2 are held together by a plurality of transverse cross bars 3 upon which rest rails 4 disposed longitudinally with the chassis. The ends of the rails in the rear are somewhat rounded off as indicated at 5 for reasons explained later. Attached also to the cross bars 3 and extending over the entire length of the side-bars 2, are angular guards 6 with a flaring upper edge 7.

Lodged within the outer leg of the side-bars 2 are anti-friction devices 8, such as rollers or balls, upon which rollably rest a generally U-shaped unloading frame 9 preferably made of two parallel channels and an angle connecting bar indicated at 10.

Attached also to the side bars 2 is a plurality of guard brackets 11 for keeping the unloading frame from sidewisely shifting. At the rear end of the side bars are end brackets 12 for engaging the downwardly curved and hook-like ends 13 of the unloading frame. (See Figure 12.)

Any suitable body 14 may be fitted to rest upon the chasis frame by providing it with a body frame 15 preferably made of channel iron into a rectangular shape and fitted with reinforcing cross bars 16.

At the lower leg of the channels suitable lugs 17 are provided as bearings for transversely disposed rollers 18 extending over the entire width of the body frame and adapted to rest and roll upon rails 4 of the chassis frame.

Rotatably lodged between the channel legs of the body frame and disposed vertically are guide rollers 19 extending somewhat beyond the body frame proper and adapted to engage the guards 6 of the chassis frame. These rollers and guards are provided for keeping the body in as nearly a central position upon the chassis as possible.

Attached at the bottom of the body are large rollers 20, rotatably mounted in yokes 21 which again may be rotated in horizontal direction being pivotally lodged at 22. These rollers are mounted in pairs and suspended above the unloading frame 9 without touching it when the body frame rollers 18 rest upon the rails of the chassis frame. They are guided by angle guides 23 attached at the upper surface of unloading frame 9, and facilitate their rolling thereupon when the body rollers leave the rails 4. (See Figure 12.)

In order to facilitate the moving of the body onto or from the chassis a conventional winding mechanism indicated at 24 is provided below the seat of the driver or at any other convenient place, and is connected through cable 25 attached at one end to the drum 26 (Figure 13) and at the other end by way of a link 27 to hook 28 to the body 14. (See Figure 12.)

At both ends of the body frame and corresponding therewith at the chassis frame are apertures 29 and 30, respectively, through which may be passed a key 31 from either side of the vehicle for keeping the body firmly united with the chassis when the vehicle travels. The key consists of a handle or ring 32 (Figure 14) a pin 33 and a spring actuated lock bar which may be set at right angles after having passed through the respective frames.

Another locking device is provided at the end of the unloading frame for keeping the latter in place when not in use. It consists of a pin 34 and hook 35 or any other convenient device for a corresponding purpose.

Operation: When the body is to be lowered from the chassis frame, the unloading frame is first released and lowered at one end to contact with the flooring or ground. The upper or other end of the frame hooks against bracket 12. The winding mechanism is then released and the body is pushed to the rear so that the wheels or rollers 20 come to rest upon the unloading frame and take off the weight of the body from rollers 18 of the body frame. The body is then rolled down until reaching the platform, floor or ground where it may be moved manually or otherwise, while the rest of the vehicle may depart.

In a similar way the loading of the body is done. The unloading frame is lowered, the cable hooked to the body, wheels 20 are aligned with the frame guards 23 and the winding mechanism operated until the body is pulled into place.

It will be observed that the rails 4 are sloped and rounded at their ends at 5 to allow the rollers 18 to gradually take over the weight of the body from wheels 20.

While the drawings show specific forms of my device, I reserve for myself the right to make changes and improvements to suit various conditions.

Having described my invention, I claim:

1. In combination with a vehicle comprising a chassis and a body, a rectangular frame associated with the chassis and having a plurality of cross bars, a plurality of parallel rails mounted upon the cross bars, angular guards provided at both sides and extending over the whole length of the frame, anti-friction rollers associated with the extending outer leg of the long frame sides, two pairs of brackets attached to the latter at both ends, a U-shaped frame adapted to roll upon said rollers and having guiding means attached at its upper surface, means for fastening said U-shaped frame to the first mentioned frame when in inoperative position, a body under frame, a plurality of transverse rollers rotatably held within the body frame and adapted to roll upon said rails, vertically disposed guide rollers extending sidewise beyond the body frame and adapted to engage said angular guards pivotably mounted rollers, attached in pairs to the body, extending below the line of rollers of the body frame and adapted to roll upon said U-shaped frame when the body has left the chassis and upon the floor when leaving said U-shaped frame, means for fastening said body frame to said guards when the body rests upon the chassis and means for facilitating the lowering of the body from the chassis and the rolling up of the body onto the chassis.

2. In combination with a vehicle, a chassis, a rectangular shaped frame associated therewith having a plurality of transversal braces, rails disposed longitudinally resting upon the latter, a pair of side guards extending in height above said rails, the long sides of the frame equipped with anti-friction rollers and side brackets, a generally U-shaped channel frame normally resting upon said rollers and adapted to form a frame extension when pulled out rearwardly, a body, a body frame, transversal rollers associated therewith and adapted to normally rest upon said rails, guide rollers adapted to engage the guards, pivotal wheels attached to the body and suspended above said U-shaped frame when the body rests upon the chassis and adapted to roll upon the U-shaped frame and the floor when disassociated from the chassis.

3. A vehicle comprising in combination, a chassis frame a body, and a body frame, an unloading frame associated with the chassis frame and having angle guides attached upon its upper surface, body frame rollers for supporting the body upon the chassis pivotedly mounted wheels attached to the bottom of the body above the unloading frame but not touching it when the body rests upon the chassis, means for preventing the unloading frame from disassociating itself from the chassis frame when in unloading position, means for locking the body frame to the chassis frame, and means for locking the unloading frame to the chassis frame.

Signed at New York, in the county of New York, and State of New York, this 21 day of August A. D. 1920.

LEONHARD LAZARETH.